(12) United States Patent
Cher

(10) Patent No.: US 10,089,181 B2
(45) Date of Patent: *Oct. 2, 2018

(54) CHECKPOINT TRIGGERING IN A COMPUTER SYSTEM

(71) Applicant: International Business Machines Corporation, Armonk, NY (US)

(72) Inventor: Chen-Yong Cher, Port Chester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 16 days.

This patent is subject to a terminal disclaimer.

(21) Appl. No.: 15/194,884

(22) Filed: Jun. 28, 2016

(65) Prior Publication Data

US 2016/0306705 A1 Oct. 20, 2016

Related U.S. Application Data

(63) Continuation of application No. 14/302,947, filed on Jun. 12, 2014, now Pat. No. 9,436,552.

(51) Int. Cl.
*G06F 11/14* (2006.01)
*G06F 11/30* (2006.01)
*G06F 11/34* (2006.01)

(52) U.S. Cl.
CPC ...... *G06F 11/1438* (2013.01); *G06F 11/3037* (2013.01); *G06F 11/3409* (2013.01); *G06F 2201/81* (2013.01); *G06F 2201/85* (2013.01)

(58) Field of Classification Search
CPC ............. G06F 11/1407; G06F 11/1438; G06F 11/1461; G06F 11/1466; G06F 11/1469; G06F 11/1471

USPC .............................................. 714/15, 16, 19
See application file for complete search history.

(56) References Cited

PUBLICATIONS

List of IBM Patents or Patent Applications Treated as Related (Appendix P), Dated Filed: Jul. 14, 2016; 2 pages.
U.S Appl. No. 14/302,921, filed Jun. 12, 2014, Entitled: Checkpointing for a Hybrid Computing Node, First Named Inventor: Chen-Yong Cher.
U.S. Appl. No. 14/302,947, filed Jun. 12, 2014, Entitled: Checkpoint Triggering in a Computer System, First Named Inventor: Chen-Yong Cher.

(Continued)

*Primary Examiner* — Joseph R Kudirka
(74) *Attorney, Agent, or Firm* — Cantor Colburn LLP; Rabin Bhattacharya

(57) ABSTRACT

According to an aspect, a method for triggering creation of a checkpoint in a computer system includes executing a task in a processing node and determining whether it is time to read a monitor associated with a metric of the task. The monitor is read to determine a value of the metric based on determining that it is time to read the monitor. A threshold for triggering creation of the checkpoint is determined based on the metric. A monitoring block size is determined for the checkpoint. A checkpoint interval is determined based on the monitoring block size, a checkpoint bandwidth, and a failure rate of the computer system. Based on determining that the value of the metric has crossed the threshold and the checkpoint interval has elapsed, the checkpoint including state data of the task is created to enable restarting execution of the task upon a restart operation.

18 Claims, 5 Drawing Sheets

(56) References Cited

PUBLICATIONS

List of IBM Patents or Patent Applications Treated as Related (Appendix P), Dated Filed: Jul. 12, 2018; 2 pages.
U.S. Appl. No. 16/033,274, filed Jul. 12, 2018, Entitled: Checkpoint Triggering in a Computer System, First Named Inventor: Chen-Yong Cher.

CHECKPOINT TRIGGERING IN A COMPUTER SYSTEM

DOMESTIC PRIORITY

This application is a continuation of U.S. patent application Ser. No. 14/302,947, filed Jun. 12, 2014, the disclosure of which is incorporated by reference herein in its entirety.

STATEMENT REGARDING FEDERALLY SPONSORED RESEARCH OR DEVELOPMENT

This invention was made with Government support under contract number B599858 awarded by the Department of Energy. The Government has certain rights in this invention.

BACKGROUND

The present invention relates generally to computer systems, and more particularly to dynamically determining a checkpoint trigger on a computer system.

In computer systems that include multiple processing resources for executing a plurality of tasks, distribution of task execution is important to system performance. Some computing systems include multiple processing nodes to execute tasks in parallel. Memory and processing bandwidth intensive tasks can be distributed to the processing nodes for parallel execution.

In high-performance computing, applications execute over long periods of time. To support error recovery, checkpoints can be established periodically to capture the state of critical values needed to restart execution and recover from an error condition. In systems of higher complexity, checkpoint overhead typically increases while decreasing overall available processing throughput. Latency associated with slower bandwidth paths further increases checkpoint overhead.

SUMMARY

According to one embodiment, a method for triggering creation of a checkpoint in a computer system includes executing a task in a processing node of the computer system and determining whether it is time to read a monitor associated with a metric of the task. The monitor is read to determine a value of the metric based on determining that it is time to read the monitor. A threshold for triggering creation of the checkpoint is determined based on the value of the metric. A monitoring block size is determined for the checkpoint. A checkpoint interval is determined based on the monitoring block size, a checkpoint bandwidth, and a failure rate of the computer system. Based on determining that the value of the metric has crossed the threshold and the checkpoint interval has elapsed, the checkpoint including state data of the task is created to enable restarting execution of the task upon a restart operation.

According to another embodiment, a processing node for triggering creation of a checkpoint in a computer system includes a memory and a processing circuit coupled to the memory. The processing circuit is configured to perform a method that includes executing a task and determining whether it is time to read a monitor associated with a metric of the task. The monitor is read to determine a value of the metric based on determining that it is time to read the monitor. A threshold for triggering creation of the checkpoint is determined based on the value of the metric. A monitoring block size is determined for the checkpoint. A checkpoint interval is determined based on the monitoring block size, a checkpoint bandwidth, and a failure rate of the computer system. Based on determining that the value of the metric has crossed the threshold and the checkpoint interval has elapsed, the checkpoint including state data of the task is created to enable restarting execution of the task upon a restart operation.

According to a further embodiment, a computer program product for triggering creation of a checkpoint in a computer system is provided. The computer program product includes a tangible storage medium readable by a processing circuit and storing instructions for execution by the processing circuit to perform a method. The method includes executing a task in a processing node of the computer system and determining whether it is time to read a monitor associated with a metric of the task. The monitor is read to determine a value of the metric based on determining that it is time to read the monitor. A threshold for triggering creation of the checkpoint is determined based on the value of the metric. A monitoring block size is determined for the checkpoint. A checkpoint interval is determined based on the monitoring block size, a checkpoint bandwidth, and a failure rate of the computer system. Based on determining that the value of the metric has crossed the threshold and the checkpoint interval has elapsed, the checkpoint including state data of the task is created to enable restarting execution of the task upon a restart operation.

DETAILED DESCRIPTION

An embodiment is directed to establishing timing and size of checkpoints on a processing node of a computer system. A processing node includes one or more processing circuits coupled to memory. Multiple processing nodes can operate in parallel as part of a larger computer system. Checkpoints store state data associated with tasks executing on the processing nodes such that the tasks can be resumed after an error condition. As tasks execute over a period of time, their memory demands and associated memory footprint can change. For example, creation of new objects can increase the memory footprint of a task, and object termination can result in de-allocation of memory. Exemplary embodiments monitor one or more metrics of a task to establish a threshold that indicates a program phase where a lower amount of memory is in use or subject to modification. This threshold can be periodically updated as task execution continues. A monitored metric is compared to the threshold to determine when to capture state data in a checkpoint, e.g., when the monitored metric is less than the threshold. A checkpoint time interval can be set dynamically based on a checkpoint latency and a failure rate of the computer system. The checkpoint latency may be determined based on checkpoint size and checkpoint storage bandwidth.

Figure 1:
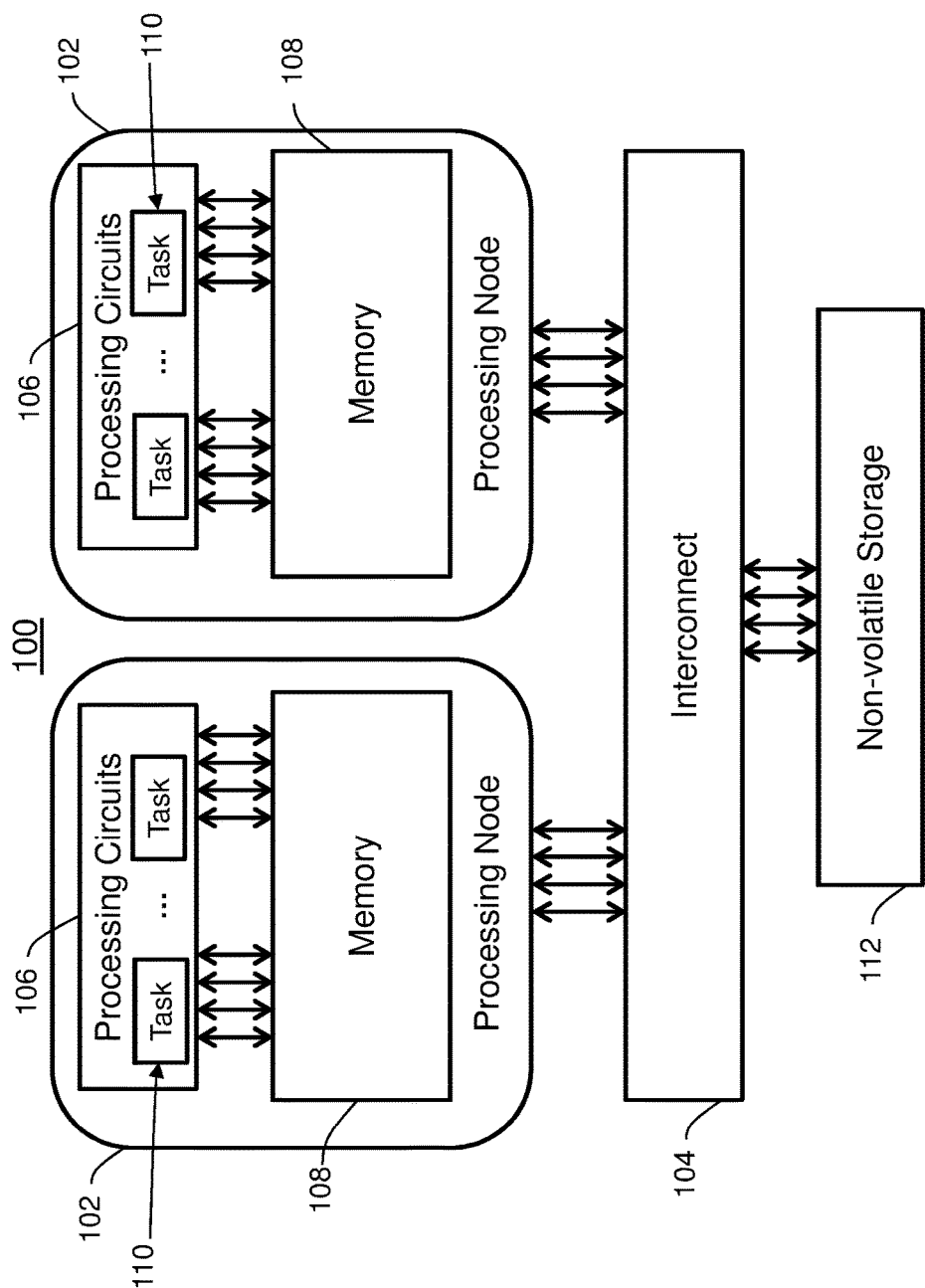
FIG. 1 illustrates a block diagram of a computer system in accordance with an embodiment.

Turning to FIG. 1, an example of a computer system 100 is depicted according to an embodiment. The computer system 100 includes at least one processing node 102 which may be coupled to an interconnect 104. The interconnect 104 can be a bus structure, a switching structure, or a network. Although the example of FIG. 1 depicts two processing nodes 102, any number (e.g., one or more) of processing nodes 102 can be coupled to the interconnect 104. The processing nodes 102 can operate independently or collectively under the control of a master processing node or main processor (not depicted). Each of the processing nodes 102 includes one or more processing circuits 106 and memory 108. The processing circuits 106 may include virtually any custom made or commercially available processor or combination of processors, such as a general purpose processor, a digital signal processor, a microcontroller, an application specific integrated circuit, a field programmable gate array, or any type of computing engine. Alternatively, one or more of the processing nodes 102 can be an active memory device. As a further alternative, multiple processing nodes 102 can collectively form a single active memory device or module.

The memory 108 may be any suitable memory type, such as one or more random access memory "RAM" chips or dies. In an embodiment, when a processing node 102 is implemented as an active memory device, the processing node 102 can include layers of memory that form a three dimensional ("3D") memory device where individual columns of memory chips or dies form memory stacks or vaults as the memory 108. Each memory stack may have one of the processing circuits 106 associated with it. Alternatively, the processing circuits 106 can be pooled and available to perform instructions using any of the memory stacks of the memory 108.

The processing circuits 106 interact with the memory 108 when executing one or more tasks 110. The tasks 110 can be any type of executable sequence of instructions, such as an application program. Each of the processing nodes 102 can create a checkpoint in its respective memory 108 to store state data that enables one or more of the tasks 110 to restart execution upon a restart operation after halting execution, e.g., due to an error condition. Upon creation of a checkpoint, execution of the tasks 110 is halted and state data can be copied as a checkpoint. After copying, execution of the tasks 110 can resume with further updates to state data being made to a data structure that is separate from the checkpoint. The state data of the checkpoint are transferred from the processing nodes 102 through the interconnect 104 to another failure domain, such as non-volatile storage 112. A checkpoint can be created periodically based on number of conditions as further described herein.

It will be understood that the computer system 100 can include a number of other elements known in the art and not depicted, such as one or more power supplies, clocks, buffers, input/output devices, user interfaces, displays, operating systems, application code, and the like. The computer system 100 can be incorporated and scaled into various types of processing systems, such as large-scale data processing centers, servers, workstations, personal computers, laptop computers, tablet computers, mobile computing devices, and the like.

Figure 2:
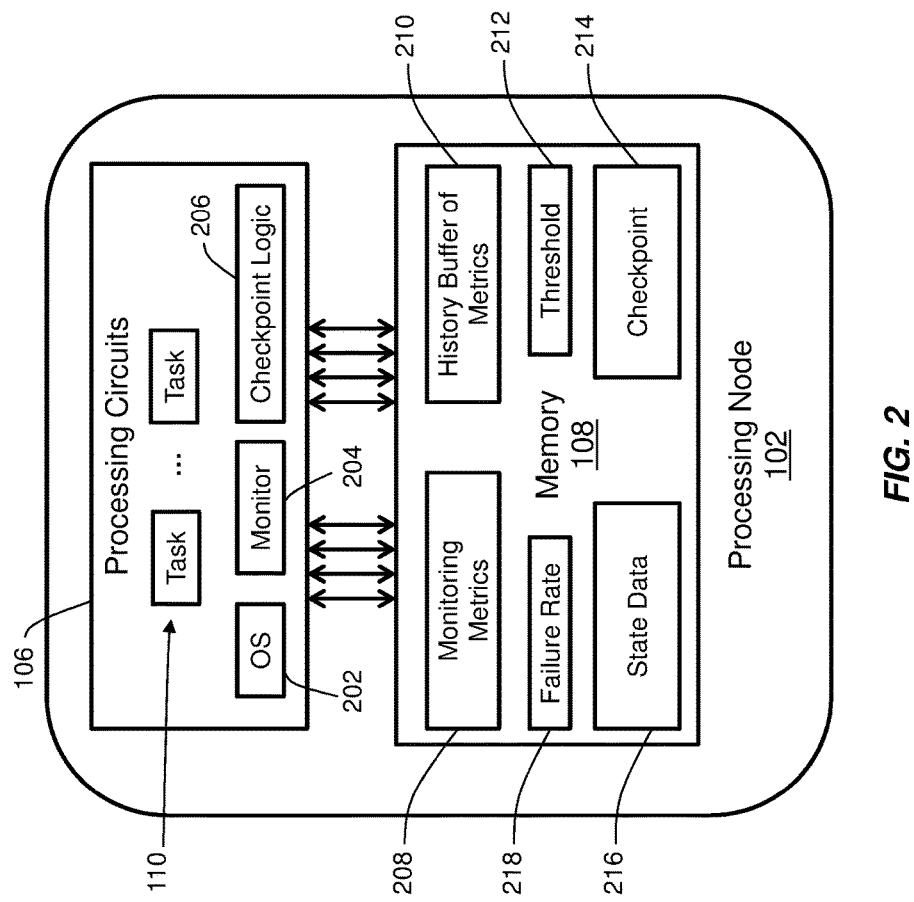
FIG. 2 illustrates further details of a processing node of the computer system of FIG. 1 in accordance with an embodiment.

FIG. 2 illustrates further details of a processing node 102 of the computer system 100 of FIG. 1 in accordance with an embodiment. In an exemplary embodiment, the processing circuits 106 execute one or more tasks 110, as well as an operating system (OS) 202, a monitor 204, and checkpoint logic 206. The OS 202 can include any type of OS known in the art. The OS may manage and track allocation of resources in the memory 108 and can provide data on a per task 110 basis. The OS 202 can make a number of memory related metrics available in the monitoring metrics 208. For example, data such as memory space allocated or freed, modified memory pages, memory footprint per task 110, stack size, heap size, and the like can be provided in the monitoring metrics 208. The monitor 204 can check the monitoring metrics 208 provided by the OS 202 and derive additional information, such as quantifying changes in a memory amount being used, an amount of memory modified, and the like. The monitor 204 can also select a block size to monitor and declare as changed per task 110. For example, the monitor 204 can track and report changes in blocks of 512 bytes, 1 kilobyte, 32 kilobytes, 512 kilobytes, 1 megabyte, etc. Using larger block sizes can reduce the number of unique areas of memory to track, while using smaller block sizes can reduce checkpoint size by not saving a large amount of unchanged data (e.g., 4 bytes changed in a 1 megabyte block).

The monitor 204 can also store past values of monitored metrics in a history buffer 210. The values of metrics stored in the history buffer 210 can be used to compute a threshold 212 for identifying when a task 110 is in program phase indicative of reduced memory utilization. For example, when a particular metric is tracked over a period of time, points of reduced utilization can be identified relative to periods of time with average or higher memory utilization. By capturing a checkpoint 214 of state data 216 at a program phase having reduced memory utilization or activity, a smaller amount of data is captured which can reduce checkpoint latency, recovery time, and storage requirements. The actual metric used for checkpointing can be defined by the task 110 upon its initialization. If the task 110 is aware of a preferred monitoring and checkpoint block size, that information can be provided by the task 110 to the monitor 204 and checkpoint logic 206.

The checkpoint logic 206 can compare the threshold 212 to a value of a metric in the monitoring metrics 208 to determine whether it is time to perform checkpointing. Examples of when it is time to perform checkpointing include when memory is de-allocated, using "free( )" in C or ~directive in C++, after a memory management epoch (also known as memory garbage collection), before or after a bursting activity of memory modifying operations in application, user-, runtime-, or compiler-inserted directives to indicate time to read, or periodically. A checkpoint interval may be used as a second interlock to ensure that a reasonable checkpoint frequency is observed. As one example, the checkpoint interval can be set based on a checkpoint latency and a failure rate 218 of the computer system 100 of FIG. 1. The failure rate 218 can be a constant value defined based on the expected system reliability, such as a mean time between failures. Alternatively, the failure rate 218 can be dynamically determined by recording failures over a period of time. In systems that experience a large number of failures, dynamic updating of the failure rate 218 can improve overall system performance, particularly if the failures are not uniformly distributed in time. Checkpoint latency can be determined based on the size of the checkpoint 214 and storage throughput. For example, if the checkpoint 214 is 1 gigabyte in size and the storage throughput for the memory 108 to store the checkpoint 214 is 4 gigabytes/second, then the checkpoint latency would be 0.25 seconds. In one embodiment, a checkpoint interval is defined as the square root of (two multiplied by the checkpoint latency multiplied by the Mean-Time-Between-Failures (MTBF), the latter defined as 1/failure rate 218). The monitoring frequency of the monitor 204 can be configured to establish a monitoring interval that is less than the checkpoint interval. A default or maximum checkpoint interval can be established to force updating of the checkpoint 214 if the threshold 212 is not crossed for a predefined maximum amount of time.

Figure 3:
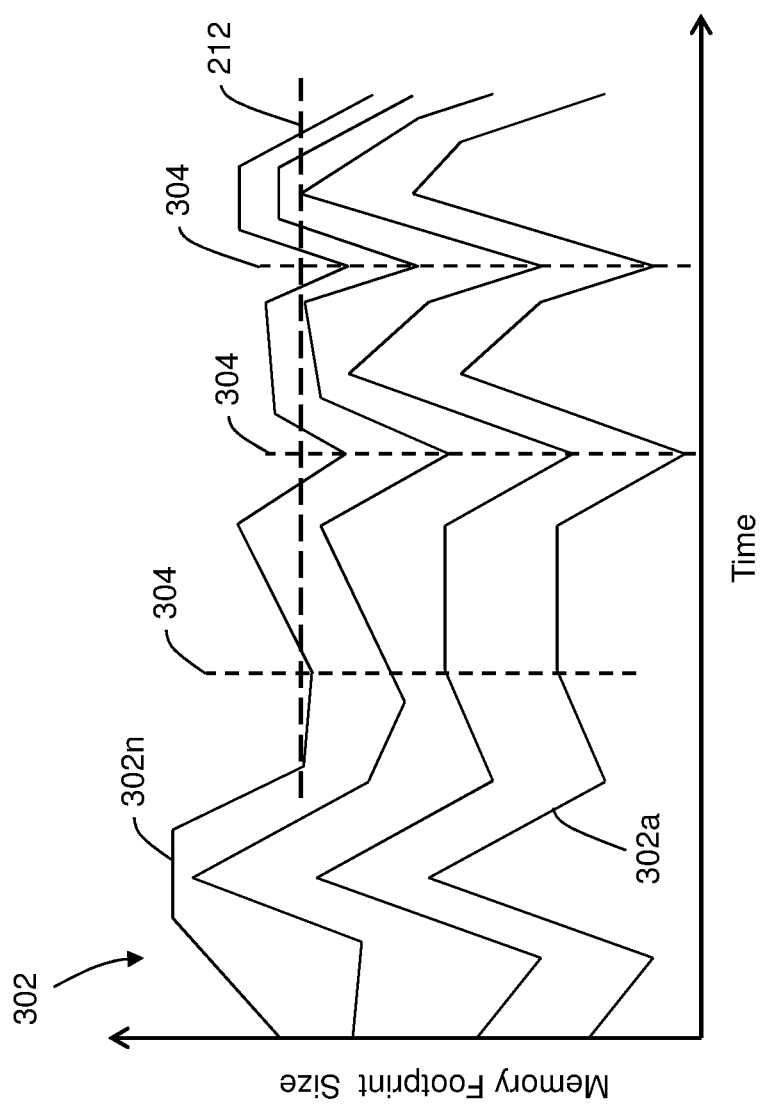
FIG. 3 is an exemplary illustration of a memory footprint size changing over time in accordance with an embodiment.

FIG. 3 is an exemplary illustration of a memory footprint size changing over time in accordance with an embodiment. Memory footprint size can be observed according to various block sizes 302 between a minimum block size 302a and maximum block size 302n. The threshold 212 of FIG. 2 can be defined according to a selected block size 302. For example, when values of memory footprint size are used as the metric for the monitor 204 of FIG. 2, values according to a particular block size 302, such as block size 302n can be captured in the history buffer 210 of FIG. 2. At points where relative low points 304 are observed while a task 110 of FIG. 2 is executing, these low points 304 are indicative of a program phase of reduced memory utilization. Note that identification of the low points 304 can change depending upon the selected block size 302. The threshold 212 can also be adjusted going forward in time should the pattern of memory usage change over time. The threshold 212 can then be used by the checkpoint logic 206 of FIG. 2 when making comparisons against the monitoring metrics 208 of FIG. 2 to determine if the checkpoint 214 of FIG. 2 should be created or updated. If the monitoring metrics 208 of FIG. 2 are frequently below the threshold 212, a checkpoint interval value can be determined to set a desired checkpoint frequency in combination with crossing the threshold 212.

Figure 4:
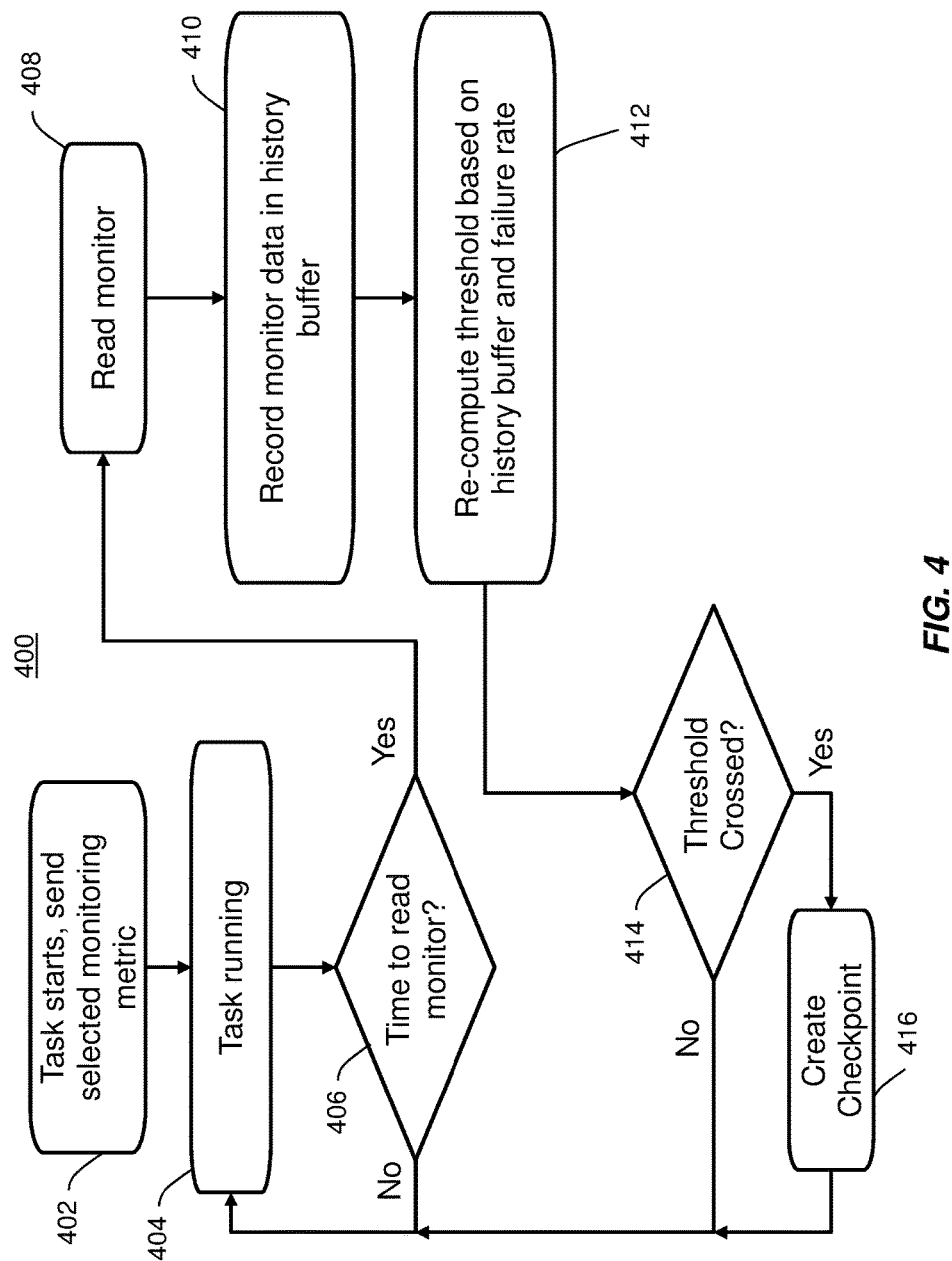
FIG. 4 is a process flow diagram for triggering creation of a checkpoint in a computer system in accordance with an embodiment.

FIG. 4 is a process flow diagram 400 for triggering creation of a checkpoint in a computer system in accordance with an embodiment. At block 402, a task starts running in a processing node of a computer system. The task can also identify a particular metric to monitor for making checkpoint threshold determinations. At block 404, the task continues running. At block 406, it is determined whether it is time to read a monitor. A monitoring frequency can be established based on the selected metric to monitor, selected block size of data to monitor, and/or a checkpoint interval definition. The time check of block 406 can be interrupt driven, or polling of a status indicator or timer value can be performed. If it is not time to read a monitor, the flow returns to block 404 to continue running the task.

If it is time to read a monitor, then at block 408 a monitored value is read, e.g., the monitor 204 of FIG. 2 reads monitoring metrics 208 of FIG. 2 as populated by the OS 202 of FIG. 2. At block 410, monitor data are recorded in a history buffer, such as history buffer 210 of FIG. 2. At block 412, a threshold is re-computed based on the history buffer and a failure rate, such as threshold 212 of FIG. 2 based on the history buffer 210 of FIG. 2 in combination with the failure rate 218 of FIG. 2. The threshold 212 of FIG. 2 may include a metric for comparison and a timing aspect to define a time interval between comparisons for the checkpoint logic 206 of FIG. 2. At block 414, a check of the monitored value of the metric read is performed relative to the threshold to determine whether the threshold has been crossed, e.g., the checkpoint logic 206 of FIG. 2 can check whether a metric value from the monitoring metrics 208 of FIG. 2 has crossed the threshold 212 of FIG. 2. If the threshold is not crossed at block 414 the flow returns to block 404; otherwise, a checkpoint is created at block 416, e.g., current values of state data 216 of FIG. 2 are copied to checkpoint 214 of FIG. 2. After the checkpoint is created at block 416, the flow returns to block 404. This process can be encoded in software, hardware, or firmware within a processing node 102.

Figure 5:
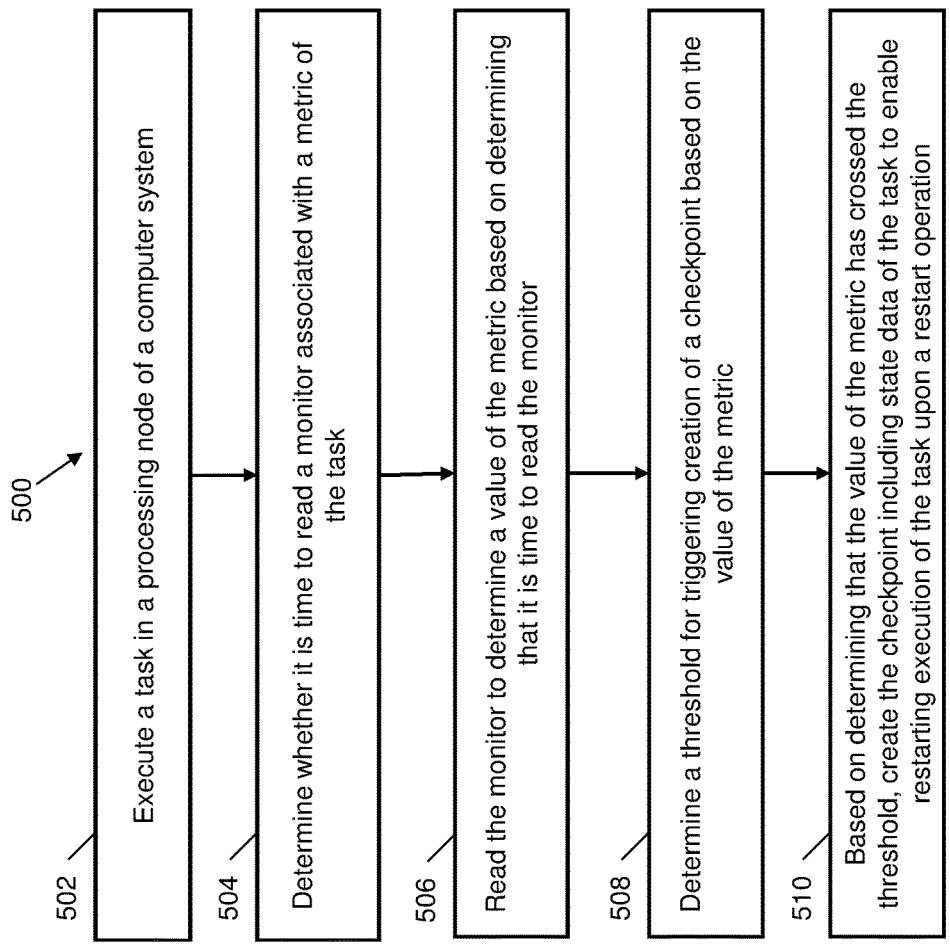
FIG. 5 is another example of a process flow diagram for triggering creation of a checkpoint in a computer system in accordance with an embodiment.

FIG. 5 is another example of a process flow diagram of a method 500 for triggering creation of a checkpoint in a computer system in accordance with an embodiment. The method 500 can be implemented in one or more of the processing nodes 102 of FIGS. 1-2 and may be applicable to numerous other system configurations as well. Accordingly, the method 500 of FIG. 5 is described in reference to FIGS. 1 and 2. To simplify the explanation, the method 500 is primarily described in reference to a single task 110 and a processing circuit 106; however, it will be understood that the method 500 is applicable to multiple tasks 110 per processing circuit 106 and multiple processing nodes 102 operable in parallel as part of the computer system 100. Execution of the method 500 can be primarily controlled by one or more of the processing circuits 106 in each of the processing nodes 102. The memory 108 or a portion thereof can be embodied as a tangible storage medium readable by at least one of the processing circuits 106 and storing instructions for execution by at least one of the processing circuits 106 to perform the method 500. Alternatively, instructions to the perform the method 500 can be stored in a removable tangible storage medium or in another tangible storage medium located elsewhere within the computer system 100.

At block 502, a task 110 is executed in a processing node 102 of a computer system 100. At block 504, it is determined whether it is time to read a monitor 204 associated with a metric of the task 110. The task 110 may identify the metric to be monitored for creating the checkpoint 214. For example, the metric can be one of: a dynamic memory allocation size, a modified memory set size, or a measured memory footprint size.

At block 506, the monitor 204 is read to determine a value of the metric based on determining that it is time to read the monitor 204. Reading the monitor 204 can include checking the monitoring metrics 208 that may be populated by the OS 202. The value of the metric can be recorded in a history buffer 210.

At block 508, a threshold 212 is determined for triggering creation of the checkpoint 214 based on the value of the metric. The threshold 212 can be computed based on a combination of multiple values of the metric stored in the history buffer 210. Multiple values of the metric stored in the history buffer 210 may be compared to identify a program phase indicative of reduced memory utilization, where the threshold 212 is set to align with the program phase. A monitoring block size for the checkpoint 214 can be determined, for example, based on a parameter provided by the task 110 or by monitoring relative changes in the amount and/or addresses of memory 108 that is modified by the task 110 over a period of time. A checkpoint interval can be determined based on the monitoring block size, a checkpoint bandwidth, and a failure rate 218 of the computer system 100. To determine the failure rate 218, the computer system 100 can be monitored for failures, and the failure rate 218 of the computer system 100 may be dynamically adjusted based on a number of computer system failures detected over a period of time.

At block 510, based on determining that the value of the metric has crossed the threshold 212, a checkpoint 214 is created that includes state data 216 of the task 110 to enable restarting execution of the task 110 upon a restart operation. Creation of the checkpoint 214 can be further based on determining that the checkpoint interval has elapsed. Based on determining the that value of the metric has not crossed the threshold 212 for a maximum timeout period, creation of the checkpoint 214 can be triggered to provide a back-up or failsafe to dynamic checkpoint triggering.

Technical effects and benefits include dynamically determining checkpoint size and frequency based on system performance characteristics. Using a reduced size checkpoint can reduce resource utilization associated with saving data that have not been modified or saving checkpoints more frequently than needed to meet reliability requirements.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for triggering creation of a checkpoint in a computer system, the method comprising:
   executing a task in a processing node of the computer system;
   determining whether it is time to read a monitor associated with a metric of the task;
   reading the monitor to determine a value of the metric based on determining that it is time to read the monitor;
   determining a threshold for triggering creation of the checkpoint based on the value of the metric;
   determining a monitoring block size for the checkpoint;
   determining a checkpoint interval based on the monitoring block size, a checkpoint bandwidth, and a failure rate of the computer system;
   based on determining that the value of the metric has crossed the threshold and determining that the checkpoint interval has elapsed, creating the checkpoint comprising state data of the task stored to enable restarting execution of the task upon a restart operation;
   detecting an error condition at the processing node;
   restoring the state data of the checkpoint from a memory responsive to detecting the error condition; and
   restarting execution of the task in the processing node based on the state data restored from the memory.

2. The method of claim 1, further comprising:
   recording the value of the metric in a history buffer; and
   computing the threshold based on a combination of multiple values of the metric stored in the history buffer.

3. The method of claim 1, further comprising:
   monitoring the computer system for failures; and
   dynamically adjusting the failure rate of the computer system based on a number of computer system failures detected over a period of time.

4. The method of claim 1, further comprising:
   based on determining that the value of the metric has not crossed the threshold for a maximum timeout period, triggering the creating of the checkpoint.

5. The method of claim 1, wherein the task identifies the metric to be monitored for creating the checkpoint.

6. The method of claim 5, wherein the metric is one of: a dynamic memory allocation size, a modified memory set size, or a measured memory footprint size.

7. A processing node for triggering creation of a checkpoint in a computer system, the processing node comprising:
   a memory; and
   a processing circuit coupled to the memory and configured to perform a method comprising:
      executing a task;
      determining whether it is time to read a monitor associated with a metric of the task;
      reading the monitor to determine a value of the metric based on determining that it is time to read the monitor;
      determining a threshold for triggering creation of the checkpoint based on the value of the metric;
      determining a monitoring block size for the checkpoint;
      determining a checkpoint interval based on the monitoring block size, a checkpoint bandwidth, and a failure rate of the computer system;
      based on determining that the value of the metric has crossed the threshold and determining that the checkpoint interval has elapsed, creating the checkpoint comprising state data of the task stored to enable restarting execution of the task upon a restart operation;
      detecting an error condition at the processing node;
      restoring the state data of the checkpoint from the memory responsive to detecting the error condition; and
      restarting execution of the task in the processing node based on the state data restored from the memory.

8. The processing node of claim 7, wherein the processing circuit is further configured to perform the method comprising:
   recording the value of the metric in a history buffer;
   computing the threshold based on a combination of multiple values of the metric stored in the history buffer.

9. The processing node of claim 7, wherein the processing circuit is further configured to perform the method comprising:
   monitoring the computer system for failures; and
   dynamically adjusting the failure rate of the computer system based on a number of computer system failures detected over a period of time.

10. The processing node of claim 7, wherein the processing circuit is further configured to perform the method comprising:
    based on determining that the value of the metric has not crossed the threshold for a maximum timeout period, triggering the creating of the checkpoint.

11. The processing node of claim 7, wherein the task identifies the metric to be monitored for creating the checkpoint.

12. The processing node of claim 11, wherein the metric is one of: a dynamic memory allocation size, a modified memory set size, or a measured memory footprint size.

13. A computer program product for triggering creation of a checkpoint in a computer system, the computer program product comprising:

a tangible storage medium readable by a processing circuit and storing instructions for execution by the processing circuit to perform a method comprising:
  executing a task in a processing node of the computer system;
  determining whether it is time to read a monitor associated with a metric of the task;
  reading the monitor to determine a value of the metric based on determining that it is time to read the monitor;
  determining a threshold for triggering creation of the checkpoint based on the value of the metric;
  determining a monitoring block size for the checkpoint;
  determining a checkpoint interval based on the monitoring block size, a checkpoint bandwidth, and a failure rate of the computer system;
  based on determining that the value of the metric has crossed the threshold and determining that the checkpoint interval has elapsed, creating the checkpoint comprising state data of the task stored to enable restarting execution of the task upon a restart operation;
  detecting an error condition at the processing node;
  restoring the state data of the checkpoint from a memory responsive to detecting the error condition; and
  restarting execution of the task in the processing node based on the state data restored from the memory.

14. The computer program product of claim 13, wherein the instructions for execution by the processing circuit to perform the method further comprise:
  recording the value of the metric in a history buffer;
  computing the threshold based on a combination of multiple values of the metric stored in the history buffer.

15. The computer program product of claim 13, wherein the instructions for execution by the processing circuit to perform the method further comprise:
  monitoring the computer system for failures; and
  dynamically adjusting the failure rate of the computer system based on a number of computer system failures detected over a period of time.

16. The computer program product of claim 13, wherein the instructions for execution by the processing circuit to perform the method further comprise:
  based on determining that the value of the metric has not crossed the threshold for a maximum timeout period, triggering the creating of the checkpoint.

17. The computer program product of claim 13, wherein the task identifies the metric to be monitored for creating the checkpoint.

18. The computer program product of claim 17, wherein the metric is one of: a dynamic memory allocation size, a modified memory set size, or a measured memory footprint size.

* * * * *